Patented Nov. 6, 1945

2,388,410

UNITED STATES PATENT OFFICE 2,388,410

KETONE RESINS

Vernon E. Haury, El Cerrito, Calif., assignor to Shell Development Company, San Francisco, Calif., a corporation of Delaware No Drawing. Application March 3, 1944, Serial No. 524,952

20 Claims. (Cl. 260—64)

This invention relates to ketone resins and to a process for their manufacture. More particularly, the invention deals with a novel class of ketone resins prepared by reacting an aldehyde with unsaturated cyclic ketones of a particular type.

It is an object of the present invention to provide a method for converting a class of higher ketones into valuable resinous materials. Another object is to provide a method of reacting these higher ketones with aldehydes in a manner which permits high yields of thermoplastic ketone resins with valuable and unusual properties not possessed by ketone resins prepared heretofore.

I have discovered that these and other objects of the invention, which will be apparent from the following description, are accomplished by condensing a particular type of cyclic and unsaturated ketones with an aldehyde in the presence of a condensing catalyst and of a substance rendering the reaction mixture homogeneous. Further, it was found that since the ketones are cyclic and contain at least two olefinic double bonds per molecule, the resins which are obtained have the property of changing their solubility characteristic upon being contacted with oxygen, which property is particularly useful and valuable in a resinous material. In general, the resins of the invention are hard, reddish colored thermoplastics which are soluble in common organic solvents.

The unsaturated cyclic ketones converted to resins by the method of the invention are substituted cyclohexen-2-ones having at least one olefinic linkage present in a side chain or side chains linked to the cyclohexenone ring. The exact structure or chemical configuration of these unsaturated ketones is not known, although it is recognized that they are unsaturated mono ketones which are substituted cyclohexenones with an olefinic linkage present in the ring probably in the $\Delta^2$ position and with at least one olefinic linkage contained in a side-chain or additional ring linked to the cyclohexenone ring. These unsaturated cyclic ketones thus contain at least two olefinic linkages and the presence in the compounds of this unsaturation, coupled with their cyclic character, is responsible for the resins obtained by condensing the ketones with aldehydes to absorb or combine with oxygen so as to cause the valuable change in solubility characteristics.

The simplest member of the class of unsaturated ketones are termed xylitones by the art. The xylitones, of which there are several isomeric compounds, are tetramer condensates of acetone of the formula $C_{12}H_{18}O$. In addition to the xylitones, other higher auto-condensation products of acetone are suitable, such as condensates which are pentamers, hexamers, heptamers, etc. Furthermore, unsaturated ketones derived by auto-condensation of other lower aliphatic ketones which are at least tetramers of such ketones are also used in obtaining the resinous products by condensation with aldehydes. Such unsaturated ketones include what may be termed the homoxylitones of methyl ethyl ketone, the homoxylitones of methyl propyl ketone, the homoxylitones of diethyl ketone, etc., all of which are tetramer auto-condensates of the parent, lower ketones. If desired, the higher and more complex auto-condensates can be employed such as the pentamer, hexamer, heptamer, etc. These unsaturated ketones are crotonaldehyde-type of auto- or self-condensation products of lower aliphatic ketones and are products or by-products obtainable by certain methods of condensation which are described in U. S. Patent 2,309,650 and copending application, Serial No. 474,060, filed January 28, 1943.

In this application, the terms "tetramer," "pentamer," "hexamer," etc., refer to the number of molecules of a lower ketone which have been combined to form a molecule of auto-condensate by crotonaldehyde-type of condensation. Thus xylitone, which is formed by condensation of four molecules of acetone to form a molecule of the product, is termed the tetramer auto-condensate of acetone and, for convenience and lack of a better name, the product obtainable by combination of five molecules of acetone is referred to as the pentamer auto-condensate of acetone. Similarly, the auto-condensate from six molecules of other ketones than acetone such as methyl ethyl ketone is termed the hexamer auto-condensate of the parent ketone. These terms are used to indicate the character of the higher auto-condensation products wherein the exact configuration of the atoms or chemical structure is unknown.

The lower aliphatic ketones employed in forming the unsaturated ketones by crotonaldehyde-type of auto-condensation include such representative compounds as acetone, methyl ethyl ketone, methyl propyl ketone, methyl isopropyl ketone, diethyl ketone, methyl butyl ketone, methyl isobutyl ketone, methyl pentyl ketone, dipropyl ketone, ethyl butyl ketone, and methyl heptyl ketone. In addition, intermediate auto-condensates like mesityl oxide can be subjected to crotonaldehyde-type of condensation to yield 12 carbon atom xylitone as well as higher multiple-unsaturated products containing 18, 24 and 30 carbon atoms which are substituted $\Delta^2$-cyclohexenones. Condensation of homomesityl oxides of the other lower aliphatic ketones are similarly suitable. By "crotonaldehyde-type" of condensation used in this specification reference is made to that type of condensation which occurs when two molecules of acetaldehyde couple with elimination of a molecule of water forming a molecule of crotonaldehyde as distinguished from aldol-type of condensation which involves coupling of two molecules of acetaldehyde with no formation or elimination of a molecule of water in the reaction which gives a molecule of aldol. The formation of the substituted $\Delta^2$-cyclohexenones also involves cyclization as well as crotonaldehyde-type of auto-condensation.

While the resin treated according to the present invention has been described as being formed by reaction of an aldehyde with a single substituted $\Delta^2$-cyclohexenone of the indicated class, the resin can be formed from mixtures of the ketones including structural isomers within the class as well as mixtures which contain different numbers of carbon atoms.

All of the class of unsaturated ketones which are tetramer or higher auto-condensates of lower aliphatic ketones have in common the characteristic structure of being substituted $\Delta^2$-cyclohexenones. While the higher compounds are not simply homologues of xylitone and homoxylitone, the class does possess an orderly regularity of structure. This may be illustrated by consideration of the auto-condensates of acetone, methyl ethyl ketone and methyl propyl ketone given in the following table together with the general formula for each series wherein $m$ is an integer of 4 to 10 and $n$ is related to $m$ by the indicated equation.

| Auto-condensate | Acetone | Methyl ethyl ketone | Methyl propyl ketone |
|---|---|---|---|
| Tetramer | $C_{12}H_{18}O$ | $C_{16}H_{26}O$ | $C_{20}H_{34}O$ |
| Pentamer | $C_{15}H_{22}O$ | $C_{20}H_{32}O$ | $C_{25}H_{42}O$ |
| Hexamer | $C_{18}H_{26}O$ | $C_{24}H_{38}O$ | $C_{30}H_{50}O$ |
| Heptamer | $C_{21}H_{30}O$ | $C_{28}H_{44}O$ | Etc. |
| Octamer | $C_{24}H_{34}O$ | Etc. | |
| Nonamer | $C_{27}H_{38}O$ | | |
| Decamer | $C_{30}H_{42}O$ | | |
| Formula of the series | $C_nH_{2(2m+1)}O$ | $C_nH_{2(3m+1)}O$ | $C_nH_{2(4m+1)}O$ |
| wherein $m$ is an integer of 4 to 10 and | | | |
| | $n=3m$ | $n=4m$ | $n=5m$ |

Preferably the unsaturated ketones contain not more than 30 carbon atoms and the most preferred compounds are the tetramers and pentamers of lower aliphatic ketones. The unsaturated ketones of the class are of the formula $C_nH_{2(m(k-1)+1)}O$ wherein $m$ and $k$ are each integers with $m$ of 4 to 10 and $k$ of 3 to 9 and $n = k \times m$. In this general formula, $n$ is related to the number of carbon atoms in the ketone and is at least 12 while $k$ represents the number of carbon atoms in the parent ketone from which the auto-condensate is derived. Further, $m$ is the measure of degree of condensation ($m$ equals 4 with the tetramer, 5 with the pentamer, etc.).

The substituted $\Delta^2$-cyclohexenones of the class indicated are converted into resinous materials by reaction with an aldehyde. For this purpose formaldehyde is a most preferred reactant in that this substance is more reactive and gives higher yields while the products are of better quality than with other aldehydes. However, other aldehydes may be used, if desired, such as acetaldehyde, propionaldehyde, butyraldehyde, isobutyraldehyde, valeric aldehyde, ethylhexanal, acrolein, crotonaldehyde, benzaldehyde, para-methylbenzaldehyde, ortho-tertiary butyl benzaldehyde, and the like, together with their homologues, analogues and suitable substitution products. In general, the aldehyde reactant used in the process is an aldehyde wherein the aldehyde group is linked directly to a member of the class consisting of the hydrogen atom and monovalent hydrocarbon radicals. Besides the free uncombined aldehydes, polymers of the aldehydes, which are capable of giving free aldehydes under the resin-forming conditions, can be used such as para-formaldehyde, para-aldehyde, meta-aldehyde, and the like.

In order to effect the reaction between a higher ketone and an aldehyde, it is necessary to place a mixture of the reactants in contact with a condensing agent or catalyst. For this purpose, any condensing agent can be employed although some types are more preferable than others. An amount of from about 0.5 to 5 per cent by weight of the reactants is used. The preferred catalysts include strong basic condensing agents such as the hydroxides, oxides and alcoholates of the alkali metals as well as strong organic bases like the quaternary ammonium bases. Other less basic agents may be used if desired such as the alkaline earth hydroxides and oxides. In some cases it may be advantageous to employ acidic substances such as sulfuric acid, hydrochloric acid, phosphoric acid, telluric acid, tungstic acid and the like as well as acid salts such as sodium acid sulfate, etc. The catalysts may be employed in the reaction mixture per se or, if desired, they may be used as a solution with a solvent. Suitable organic solvents may be employed for this purpose. Particularly suited are aqueous solutions of the alkali metal hydroxides, the quaternary ammonium bases, the acids and the acid salts.

The higher ketones employed as starting materials in the process are substantially insoluble in water and in aqueous solutions of the aldehydes such as an aqueous solution of the most preferred reactant, formaldehyde. In order that the reaction between the ketones and aldehydes be effected readily, it is desirable that the reaction mixture be in a homogeneous state, i. e., that the reactants and catalyst be in a solution comprising a single phase, at least at the start and early part of the reaction. To this end, a homogenizing solvent is employed in the reaction mixture. In the absence of a homogenizing solvent, the yield of resin is very low. Many solvents are suitable for this purpose and the choice of a particular solvent will depend upon the particular reactants employed, the catalyst used and the presence or absence of water in the mixture. The lower aliphatic alcohols such as methanol, ethanol, isopropanol, etc., are particularly suitable homogenizing solvents. The amount of these homogenizing solvents employed will depend upon the character of the reaction mixture. In general, sufficient homogenizing solvent is used so that the reaction mixture is homogeneous at least when first heated.

The homogenizing solvent may serve a twofold purpose in the process. Besides rendering the reaction mixture homogeneous, it may also be used to regulate the temperature of the reaction mixture during the heating thereof since ordinarily the reaction is effected at not overly high temperatures. By heating the reaction mixture in a vessel fitted with a reflux condenser, the temperature may be made to reach and hold the boiling temperature of the mixture and this will be largely dependent upon the refluxing temperature of the homogenizing solvent especially after the reaction has progressed to a considerable extent with substantially no other lower boiling constituents remaining in the mixture. To effect the desired reaction, temperatures, in general, between about 50° C. and 150° C. are employed.

While temperatures of from about 50° C. to 150° C. are preferred for effecting the condensation to form the resin, higher temperatures can be used if desired. Thus, the reaction mixture containing the reactants, catalyst solution and homogenizer, can be heated in a closed pressure vessel at a temperature between 150° C. and 300° C. in order to convert the ketones to resins. In general, however, temperatures within the preferred range are most desirable since the resins obtained in this manner are lighter in color than those prepared at the higher temperatures.

Upon completion of the resin-forming condensation reactions between the ketones and aldehydes, the resin may be recovered from the reaction mixture by several suitable methods. A preferred procedure is to wash the mixture with a catalyst solvent such as water so that the mixture will be substantially freed of the condensing agent. If desired, the catalyst may be destroyed by neutralization with an appropriate acidic or basic substance. The mixture may then be distilled, first at higher pressures such as atmospheric to remove the homogenizing solvent, catalyst solvent, unreacted reactants and low-boiling products, and secondly at reduced pressures to remove higher-boiling products from the ketone resin. By completing the distillation operation at very low pressures of 1 to 10 mm. of Hg and at temperatures between about 150° C. and 250° C., but below a temperature at which appreciable thermal decomposition of the resin occurs, the resin is obtained in a hard, brittle, desirable form. Besides the above-outlined scheme of recovery of the resin, other methods may be employed, if desired, such as fractional precipitation, extraction and the like.

It has been found that subjecting the resinous materials to the distillation operation serves a two-fold purpose; one, volatile materials associated with the resins are removed and two, the subjecting of the resins to the action of heat after removal of the condensation catalyst cures the resins, which effect is manifested by an increase in the softening point. In some cases it is desirable to separate the resin from the other constituents of the reaction mixture such as the homogenizing solvent, condensation catalyst and unreacted materials, and then subject the separated resin to the action of heat under anhydrous conditions using a temperature of 150° C. to 250° C. whereby the softening point of the resin is increased by the treatment. This curing operation does not in general cause the resins to set to an insoluble and infusible state. In other words, the resins of the invention prepared from saturated aldehydes are not thermo-setting, but rather, are thermoplastic although they are subject to curing by heat which causes their softening points to be raised. Although the softening point of the resins is increased by heating the initial reaction mixture at the higher indicated temperatures, this procedure is undesirable since the presence of the catalyst at the high temperature causes the resins to become more discolored than when the heating is done after removal of the catalyst.

The unique resins of the invention prepared from higher ketones containing at least two olefinic double bonds in the molecule combine with or absorb oxygen and may be converted to the less-soluble form by contact with oxygen. A suitable method of converting the resins is to dissolve them in a suitable solvent and pass on oxygen-containing gas such as air through the solution. The rate of absorption of oxygen by the resins is increased in the presence of a siccative and heat and, if desired, the resins may be changed to the less-soluble form more rapidly by incorporating in them driers such as lead, manganese and/or cobalt naphthenates, linoleates, resinates and other like-acting substances.

The resins are very useful substances. They may be employed in coating compositions, impregnating compositions, film-forming compositions and the like as well as for electrical insulation, manufacturing molded articles and numerous other miscellaneous uses.

The following examples are given for the purpose of illustrating various details of the invention, but are not to be construed as limitative:

Example I

About 1240 gms. of xylitone ($C_{12}H_{18}O$) and 565 gms. of 37% aqueous formaldehyde were homogenized with 1100 gms. of methanol to which was added sodium hydroxide (0.5% of total charge) in the form of its 30% aqueous solution. The mixture was warmed cautiously, an exothermic reaction taking place, and finally refluxed for a period of three hours. The methanol was distilled from the mixture and the residue washed with water to remove caustic. Unreacted ketone was then separated by vacuum distillation. The product weighing about 850 gms. was obtained as the residue from this distillation and solidified on cooling to a brittle resin. The physical properties of a sample of the resin were as follows:

Per cent carbon_____ 79.5
Per cent hydrogen_____ 9.3
Mol. wt_____ 600
M. P., °C. (Mercury)_____ 70
Color_____Orange to red, E to H (rosin scale)

Example II

About 100 gms. of xylitone (B. R. 110–112.5° C. at 10 mm.), 32 gms. of acrolein, and sufficient methanol to render the mixture homogeneous, together with 0.5% sodium hydroxide as its 30% aqeous solution, were refluxed for about 2 hours. The resin layer which formed during the heating was separated and washed twice with water to remove the basic catalyst. The washed resin layer was then distilled under a pressure of 2 mm. Hg up to a temperature of 180° C. for removal of unreacted ketone. The resin obtained was a brittle, dark red solid having a softening point on a hot plate of 46 to 60° C. and a molecular weight of 510 by ebullioscopic determination in benzene.

Example III

A ketone resin was prepared from a mixture of isomeric substituted $\Delta^2$-cyclohexenones of the formula $C_{15}H_{22}O$ having a boiling range of 142° C. to 175° C. at 10 mm. pressure. The ketone mixture was obtained as a higher boiling by-product from preparation of isophorone by crotonaldehyde-type auto-condensation of acetone with aqueous potassium hydroxide in liquid phase at about 170° C.

A mixture of about 250 gms. of the ketone, 166 gms. of 36% aqueous formaldehyde, and sufficient methanol (about 300 gms.) to render the reaction mixture homogeneous, to which was added sodium hydroxide in amount of 0.5% of the total mixture, was heated at reflux temperature for about 3 hours. The reaction mixture was then cooled, the catalyst neutralized and the resin layer separated. The separated layer was washed several times with hot water and distilled to 180° C. at 2 mm. pressure. About 80 gms. of unreacted ketone was recovered by the distillation while about 193 gms. of the thermoplastic ketone resin remained as residue. The resin had a color of D on the Rosin scale and a softening point of about 78° C.

Example IV

About 178 gms. of xylitones ($C_{12}H_{18}O$) obtained by crotonaldehyde-type auto-condensation of mesityl oxide was mixed with 81 gms. of 37% aqueous formaldehyde solution. To this mixture was added approximately 5 gms. of 30% aqueous sodium hydroxide solution and about 95 gms. of methanol which rendered the mixture homogeneous. The mixture was contained in a flask fitted with a reflux condenser and upon heating the contents of the flask, the temperature of the mixture remained at about 76° C. owing to the refluxing of the methanol therein. The mixture remained homogeneous for about ½ hour after which two liquid phases separated. The heating was continued over a total period of about 3 hours. The mixture was then cooled, brine added and the resin phase extracted with ether. The ether was dried with anhydrous sodium sulphate and the ether distilled therefrom. The remaining oil was then distilled in vacuo and after removal of the distillable material, about 106 gms. of a reddish, brittle, transparent resin was obtained. This resin had a color corresponding to E on the rosin color scale and was soluble in alcohols, ketones, esters, aromatic hydrocarbons and paraffinic hydrocarbons. A cryoscopic determination in glacial acetic acid indicated the molecular weight was about 530. Exposure of the resin to the action of air increased its oxygen content and changed it to a form which was insoluble in paraffinic hydrocarbons.

The presence of the homogenizer in the reaction mixture is essential to obtaining a practical rate of resin formation. With a reaction mixture containing the same amount of identical reactants, but in the absence of the homogenizer, methyl alcohol, which was treated under the same conditions as in the preceding example, the quantity of resin amounted to less than one gram.

Example V

A mixture containing about 258 gms. of cylic unsaturated ketones having the formula $C_{18}H_{26}O$ prepared by crotonaldehyde-type auto-condensation of mesityl oxide, about 83 gms. of 36% aqueous formaldehyde solution, and about 0.5% of sodium hydroxide in the form of an aqueous solution was prepared. To this mixture was added about 170 gms. of methanol to make it homogeneous and the mixture was then heated for approximately three hours at a temperature of $65\pm5°$ C. The resin formed was recovered in a similar manner to that described in Example III. The resin had a color of E on the Rosin scale and softened at 95° C.

Example VI

Approximately 169 gms. of substituted $\Delta^2$-cyclohexenones of the formula $C_{24}H_{34}O$ from condensation of mesityl oxide, about 42 gms. of 36% aqueous formaldehyde solution, and 0.5% sodium hydroxide as aqueous solution together with about 325 gms. of methanol were heated at a temperature of $65\pm5°$ C. for three hours. About 169 gms. of light red brittle resin was recovered from the reaction mixture which was slightly darker in color than that described in Example V.

Example VII

A mixture of isomers of substituted $\Delta^2$-cyclohexenone of the formulas $C_{12}H_{18}O$ (xylitone) and $C_{15}H_{22}O$ which had a boiling range of 110° C. to 140° C. at 10 mm. was reacted with formaldehyde to give a resin. About 100 gms. of the ketone, 82 gms. of 36% formalin, and sufficient methanol to render the reaction mixture homogeneous when mixed together with 0.5% sodium hydroxide as its 30% aqueous solution, were heated in a closed nickel bomb at 145° C. to 165° C. for 1½ hours. The catalyst was then neutralized, the resin layer separated and distilled in vacuo whereupon about 9 gms. of unreacted ketone was discovered. The resin obtained amounted to about 86 gms. and was a brittle solid which was black in color owing to the high temperature employed and the presence of the catalyst at that temperature.

Example VIII

A mixture of about 100 gms. of ketone (the same as that described in Example VII), 89 gms. of 36% formalin, sufficient methanol to render the mixture homogeneous, and 0.5% sodium hydroxide based on the total weight of the mixture, was heated in a nickel bomb for 1½ hours at 140° C. to 150° C. The catalyst was neutralized and the resin layer separated. In order to determine the effect of avoiding the high temperature used in removing unreacted ketone which cures the resin and increases its softening point, the separated layer was steam distilled to remove the unreacted ketone. In this manner, about 24 gms. of ketone was recovered. The resin obtained in an amount of about 64 gms. was dark red in color and soft and sticky in consistency. By subjecting the resin to temperatures of 160° C. to 180° C. after its initial formation, it can be converted to a hard material of satisfactory softening point.

Example IX

Tetra ethyl ammonium hydroxide was tested as a polymerization catalyst by heating a mixture consisting of about 178 gms. of xylitones described in Example I, 81 gms. of 37% aqueous formaldehyde solution, 120 gms. of methanol, and 20 gms. of 10% aqueous tetra ethyl ammonium hydroxide. The mixture was refluxed at about 78° C. for three hours. The product was washed with water and distilled in vacuo. After removal of unreacted unsaturated ketones and lower-boiling constituents, there remained about 107 gms. of light-colored, hard, brittle resin having a color of G on the rosin color scale.

Example X

A mixture containing about 178 gms. of xylitones from condensation of mesityl oxide, 30 gms. of formaldehyde in the form of a 37% aqueous solution, 5 gms. of 96% sulfuric acid, and sufficient methanol to homogenize the mixture was heated at refluxing temperature for approximately three hours. The resin which was recovered was dark red in color.

Example XI

A crude mixture of cyclic unsaturated ketones was converted into a resin. The ketone mixture boiled at 110° C. to 175° C. at 10 mm. pressure and consisted of various isomeric compounds of the formula $C_{12}H_{18}O$ and $C_{15}H_{22}O$ which were substituted $\Delta^2$-cyclohexenones.

About 250 gms. of the ketone, 186 gms. of 36% formalin, 35 gms. of 30% aqueous sodium hydroxide and sufficient methyl alcohol to homogenize, were heated at reflux temperature for 3 hours. The catalyst was neutralized, the resin layer separated and then subjected to distillation in vacuo for recovery of about 42 gms. of unreacted ketone. About 250 gms. of resin was obtained which was of color F on the Rosin scale and had a softening point of 85° C. on a hot plate.

Example XII

A mixture was prepared containing about 178 gms. of xylitones from condensation of mesityl oxide, 200 gms. of methanol, and 5 gms. of 30% aqueous sodium hydroxide solution. To this mixture there was added about 44 gms. of acetaldehyde in 100 gms. of methanol in the course of 15 minutes while maintaining the temperature at about 15° C. The entire mixture was then heated for about 3 hours at a refluxing temperature of about 69° C. The product was water-washed and distilled. The resin obtained amounted to about 38 gms. and was a dark red, brittle solid with the following solubility characteristics:

| Solvent | Cold | Hot |
| --- | --- | --- |
| P and V thinner | Partly soluble | Soluble. |
| Acetone | Soluble | Do. |
| Methanol | Slightly soluble | Slightly soluble. |
| Carbon tetrachloride | Soluble | Soluble. |
| Normal butyl acetate | do | Do. |
| Diethyl ether | do | Do. |
| Isopropanol | do | Do. |

Example XIII

Approximately 178 gms. of xylitones from condensation of mesityl oxide, 106 gms. of benzaldehyde, 4 gms. of 30% aqueous sodium hydroxide solution, and 150 gms. of methanol were heated at about 72° C. for 5 hours. The reaction product was washed with water and distilled under subatmospheric pressure. The distillable material at about 215° C. under 1 mm. pressure was removed and about 11 gms. of dark red resin remained. This resin was soluble in P and V thinner, ketones, alcohols higher than methanol and slightly soluble in methanol.

Examples XIV

Samples of resin prepared from mesityl oxide condensate and formaldehyde were given the treatment indicated in the following table and were analyzed thereafter:

| Treatment | Per cent C | Per cent H | Per cent O (by diff.) | $\frac{C}{H}$ |
| --- | --- | --- | --- | --- |
| None | 79.9 | 9.3 | 10.8 | 8.60 |
| Air blown in isododecane at 90° C. for 15 hours | 72.7 | 8.5 | 18.7 | 8.56 |
| Air blown in benzene at 80° C. for 30 hours | 78.0 | 8.8 | 13.2 | 8.87 |
| Powder exposed to air at 25° C. for 2 weeks | 70.3 | 8.2 | 21.5 | 8.57 |

The results obtained from the experiments demonstrate the ability of the resin to absorb oxygen. Furthermore, the fact that the ratio of carbon to hydrogen $$\frac{(C)}{(H)}$$

remains substantially constant indicates that the oxygen combines with the resin with no appreciable removal of carbon or hydrogen therefrom.

This application is a continuation-in-part of my copending application, Serial No. 337,686, filed May 28, 1940.

I claim as my invention:

1. A process for the production of ketone resins which comprises heating a substituted $\Delta^2$-cyclohexenone with an aldehyde wherein the aldehyde group is linked directly to a member of the class consisting of the hydrogen atom and monovalent hydrocarbon radicals, said heating being effected with the reactants in the presence of a condensing agent and sufficient organic homogenizing solvent to render the reaction mixture homogeneous at least when first heated and said substituted $\Delta^2$-cyclohexenone being an auto-condensation product of an aliphatic ketone and of the formula $C_nH_{2(m(k-1)+1)}O$ wherein $m$ and $k$ are integers with $m$ of 4 to 10 and $k$ of 3 to 9 and $n=k\times m$.

2. A process for the production of ketone resins which comprises heating a substituted $\Delta^2$-cyclohexenone with formaldehyde in the presence of a basic-acting condensing agent and sufficient methyl alcohol to render the reaction mixture homogeneous at least when first heated, said substituted $\Delta^2$-cyclohexenone being an auto-condensation product of an aliphatic ketone and of the formula $C_nH_{2(m(k-1)+1)}O$ wherein $m$ and $k$ are integers with $m$ of at least 4 and $k$ of at least 3 and $n=k\times m$ but not more than 30.

3. A process for the production of ketone resins which comprises heating formaldehyde with a substituted $\Delta^2$-cyclohexenone auto-condensation product of acetone of the formula $C_nH_{2(2m+1)}O$ wherein $m$ is an integer of 4 to 10 and $n=3m$, said heating being effected with the reactants in the presence of an alkali metal hydroxide and sufficient organic homogenizing solvent to render the reaction mixture homogeneous at least when first heated.

4. A process for the production of ketone resins which comprises heating formaldehyde with a substituted $\Delta^2$-cyclohexenone auto-condensation product of acetone of the formula $C_nH_{2(2m+1)}O$ wherein $m$ is an integer of at least 4 and $n=3m$ but is not greater than 30, said heating being effected with the reactants in the presence of an alkali metal hydroxide and sufficient methyl alcohol to render the reaction mixture homogeneous at least when first heated.

5. A process for the production of ketone resins which comprises heating formaldehyde with a substituted Δ²-cyclohexenone auto-condensation product of acetone of the formula $C_nH_{2(m+1)}O$ wherein $m$ is an integer of at least 4 and $n=3m$ but is not greater than 30, said heating being effected with the reactants in the presence of an alkali metal hydroxide and sufficient methyl alcohol to render the reaction mixture homogeneous at least when first heated, and subsequently heating the formed resin which has been freed of the condensing catalyst at a temperature of 150° C. to 250° C. whereby the softening point of the resin is increased.

6. A process for the production of ketone resins which comprises heating xylitone with formaldehyde in the presence of sodium hydroxide, and sufficient methyl alcohol to render the reaction mixture homogeneous at least when first heated.

7. A process for the production of ketone resins which comprises heating xylitone with formaldehyde in the presence of sodium hydroxide and sufficient methyl alcohol to render the reaction mixture homogeneous at least when first heated, and subsequently heating the formed resin which has been freed of the condensing agent at a temperature of 150° C. to 250° C. whereby the softening point is increased above that of the initially formed resin.

8. A process for the production of ketone resins which comprises heating formaldehyde with a substituted Δ²-cyclohexenone auto-condensation product of methyl ethyl ketone of the formula $C_nH_{2(3m+1)}O$ wherein $m$ is an integer of 4 to 10 and $n=4m$.

9. A process for the production of ketone resins which comprises heating a substituted Δ²-cyclohexenone product of crotonaldehyde-type auto-condensation of mesityl oxide containing not more than 30 carbon atoms with an aldehyde wherein the aldehyde group is linked directly to a member of the class consisting of the hydrogen atom and monovalent hydrocarbon radicals in the presence of a basic-acting condensation agent and sufficient organic homogenizing solvent to render the reaction mixture homogeneous at least when first heated.

10. A process for the production of ketone resins which comprises heating a substituted Δ²-cyclohexenone product of crotonaldehyde-type auto-condensation of mesityl oxide with formaldehyde in the presence of an alkali metal hydroxide and sufficient methanol to render the reaction mixture homogeneous at least when first heated.

11. A thermoplastic ketone resin from the reaction at an elevated temperature in the presence of a condensing agent of a substituted Δ²-cyclohexenone with an aldehyde wherein the aldehyde group is linked directly to a member of the class consisting of the hydrogen atom and monovalent hydrocarbon radicals, said substituted Δ²-cyclohexenone being an auto-condensation product of an aliphatic ketone and of the formula $C_nH_{2(m(k-1)+1)}O$ wherein $m$ and $k$ are integers with $m$ of 4 to 10 and $k$ of 3 to 9 and $n=k\times m$.

12. A thermoplastic ketone resin from the reaction at an elevated temperature in the presence of a condensing agent of a substituted Δ²-cyclohexenone with formaldehyde, said substituted Δ²-cyclohexenone being an auto-condensation product of an aliphatic ketone and of the formula $C_nH^2(m(k-1)+1)O$ wherein $m$ and $k$ are integers with $m$ of at least 4 and $k$ of at least 3 and $n=k\times m$ but not more than 30.

13. A thermoplastic ketone resin from the reaction at an elevated temperature in the presence of a condensing agent of an aldehyde wherein the aldehyde group is linked directly to a member of the class consisting of the hydrogen atom and monovalent hydrocarbon radicals with a substituted Δ²-cyclohexenone auto-condensation product of acetone of the formula $C_nH_{2(2m+1)}O$ wherein $m$ is an integer of 4 to 10 and $n=3m$.

14. A thermoplastic ketone resin from the reaction at an elevated temperature in the presence of a condensing agent of formaldehyde with a substituted Δ²-cyclohexenone auto-condensation product of acetone of the formula $C_nH_{2(2m+1)}O$ wherein $m$ is an integer of at least 4 and $n=3m$ but is not greater than 30.

15. A thermoplastic ketone resin from the reaction at an elevated temperature in the presence of a condensing agent of formaldehyde with xylitone.

16. A thermoplastic ketone resin from the reaction at an elevated temperature in the presence of a condensing agent of formaldehyde with a substituted Δ²-cyclohexenone auto-condensation product of methyl ethyl ketone of the formula $C_nH_{2(3m+1)}O$ wherein $m$ is an integer of 4 to 10 and $n=4m$.

17. A thermoplastic ketone resin from the reaction at an elevated temperature in the presence of a condensing agent of formaldehyde with a homoxylitone of methyl ethyl ketone.

18. A thermoplastic ketone resin from the reaction at an elevated temperature in the presence of a condensing agent of an aldehyde wherein the aldehyde group is linked directly to a member of the class consisting of the hydrogen atom and monovalent hydrocarbon radicals with a substituted Δ²-cyclohexenone containing at least two olefinic double bonds and not more than 30 carbon atoms per molecule obtained by crotonaldehyde-type auto-condensation of mesityl oxide.

19. A thermoplastic ketone resin from the reaction at an elevated temperature in the presence of a condensing agent of a substituted Δ²-cyclohexenone from crotonaldehyde-type auto-condensation of mesityl oxide containing at least two olefinic double bonds and not more than 30 carbon atoms per molecule with a lower aliphatic aldehyde.

20. A thermoplastic ketone resin from the reaction at an elevated temperature in the presence of a condensing agent of formaldehyde with a crotonaldehyde-type auto-condensation product of mesityl oxide containing at least two olefinic double bonds and not more than 30 carbon atoms per molecule which is a substituted Δ²-cyclohexenone.

VERNON E. HAURY.